Figure 5:
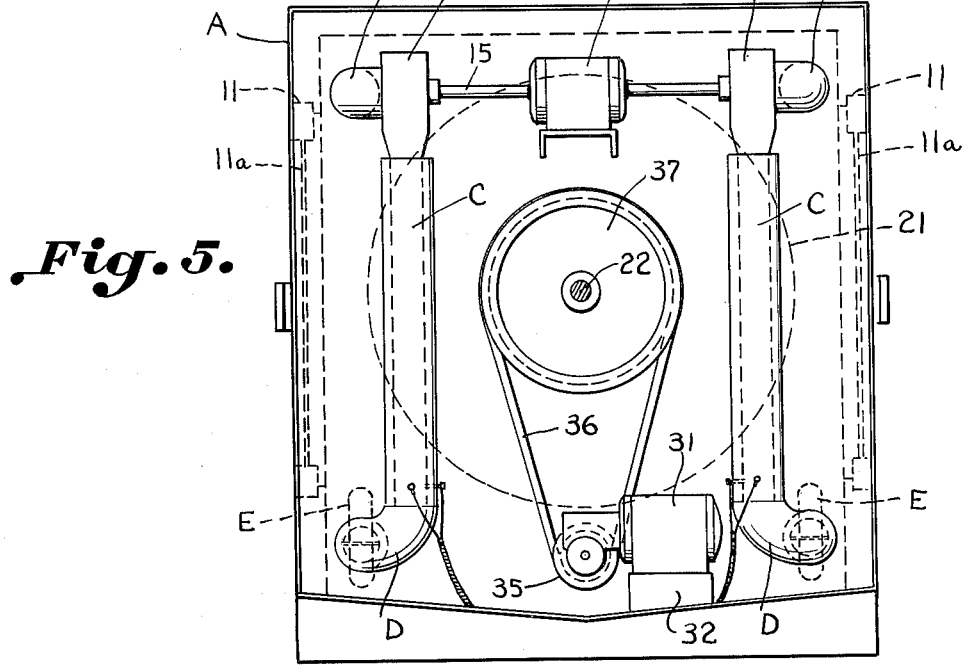

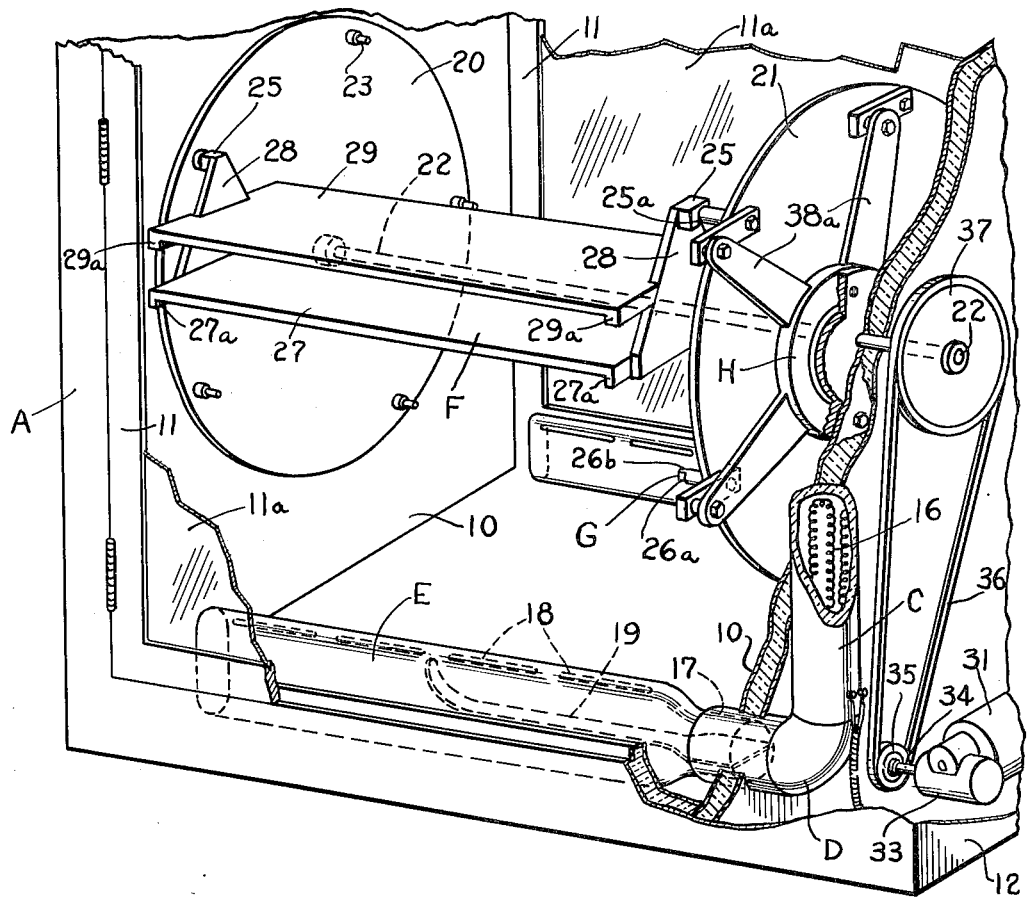
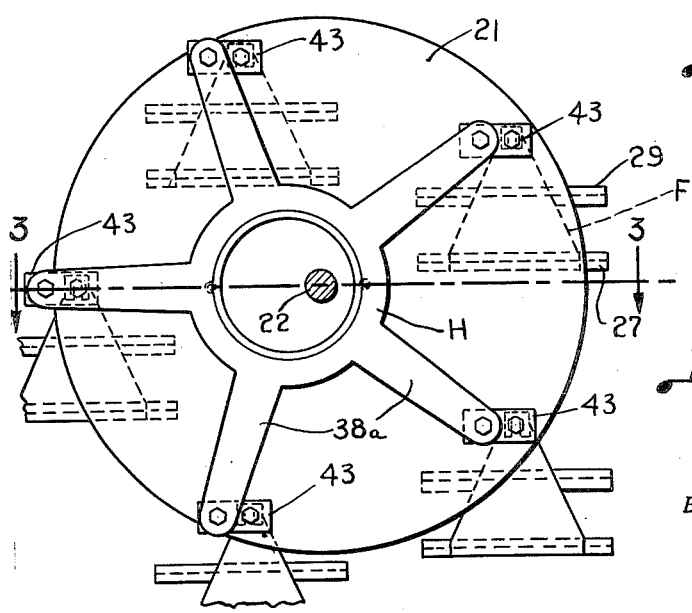
Fig. 1.
Fig. 2.

Feb. 1, 1966 C. M. VAUGHAN 3,232,247
OVEN ASSEMBLY
Original Filed June 7, 1960 3 Sheets-Sheet 2
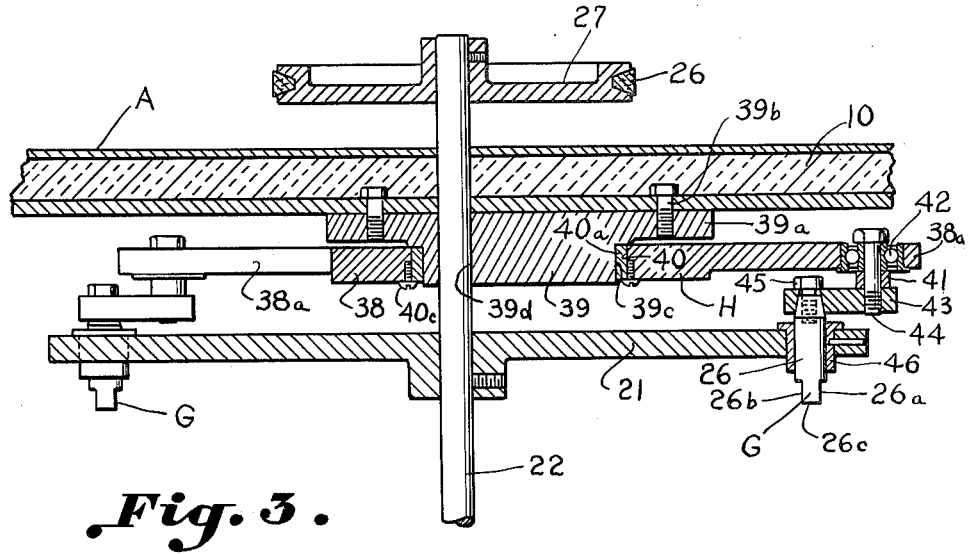
Fig. 3.
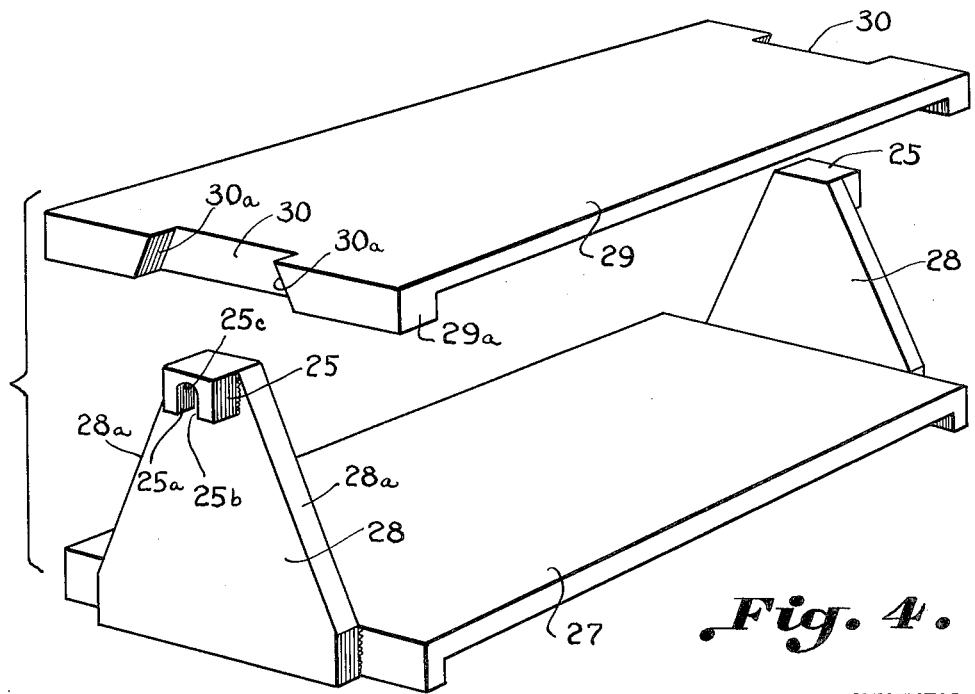
Fig. 4.
INVENTOR.
CHARLES M. VAUGHAN
BY 
ATTORNEY Feb. 1, 1966            C. M. VAUGHAN            3,232,247

OVEN ASSEMBLY

Original Filed June 7, 1960            3 Sheets-Sheet 3

*INVENTOR.*
CHARLES M. VAUGHAN
BY
ATTORNEY

United States Patent Office 3,232,247
Patented Feb. 1, 1966

3,232,247
OVEN ASSEMBLY
Charles M. Vaughan, Greenville, S.C., assignor to Metal Stamping Co. of Greenville, Inc., Greenville, S.C., a corporation of South Carolina
Continuation of application Ser. No. 39,422, June 7, 1960. This application Apr. 29, 1963, Ser. No. 277,411
3 Claims. (Cl. 107—59)

This is a continuation of application Serial No. 39,422, filed June 7, 1960, and now abondoned.

This invention relates to an improved oven assembly in which a uniform heat is maintained throughout the oven for cooking edibles on positively positioned removable trays which are rotatable about a central axis.

This invention is concerned with the problem of providing a simplified means of maintaining cooking trays within an oven for rotation about a central axis in a horizontal position at all times. It is especially desirable that such trays be positively positioned when baking pies and the like which have liquid fillings which are easily displaced and which thus tend to unbalance the trays causing spilling of the contents of the tray into the closed oven. It is important that trays of this type be easily removable for unloading the oven and for purposes of cleaning. When cooking a number of items within the oven, there is a tendency to improperly position the items so as to unbalance the tray causing the same tendency to spill the contents of the trays within the oven. By positively positioning such trays, it has been found that greater tray capacity may be had so that the provision of a uniform heat is especially important since the articles may be stacked one above the other. Thus cooking by radiant heat, made possible because of the uniform ambient temperature, makes possible uniform cooking of an increased number of articles. The capacity of the oven is further increased by maintaining the heating means externally of the oven. Formerly, ovens which sought to solve these problems were relatively complicated from the standpoint of mechanical operation and failed to provide practical solutions.

Accordingly, it is an object of this invention to provide an oven assembly having improved means for heating air externally of the oven and circulating same within the oven for providing an even temperature throughout the oven together with an improved tray structure.

An important object of this invention is to provide an improved oven tray structure in which the trays are positively positioned for rotation about a central axis.

Another object of this invention is the provision of a double tray structure in which a plurality of individual tray structures are spaced radially of a central axis in which each individual tray includes a pair of superposed trays.

Another object of this invention is the provision of a plurality of individual tray structures spaced radially about a central axis each of which is removable from a shank having flat sides which positively positions same without further fastening means.

Another object of the invention is the provision of an individual tray structure including a pair of superposed trays in which the upper tray is removable without adjusting fastening means.

Another object of this invention is the provision of an oven tray structure which is easy to clean.

Another object of this invention is the provision of a positively positioned tray structure which is positively positioned to prevent spilling the edible contents of the tray.

Another object of the invention is the provision of a simple positive means for positioning oven trays radially of a central axis to provide increased oven capacity.

The construction designed to carry out the invention will be hereinafter described, together with other features thereof.

Figure 6:
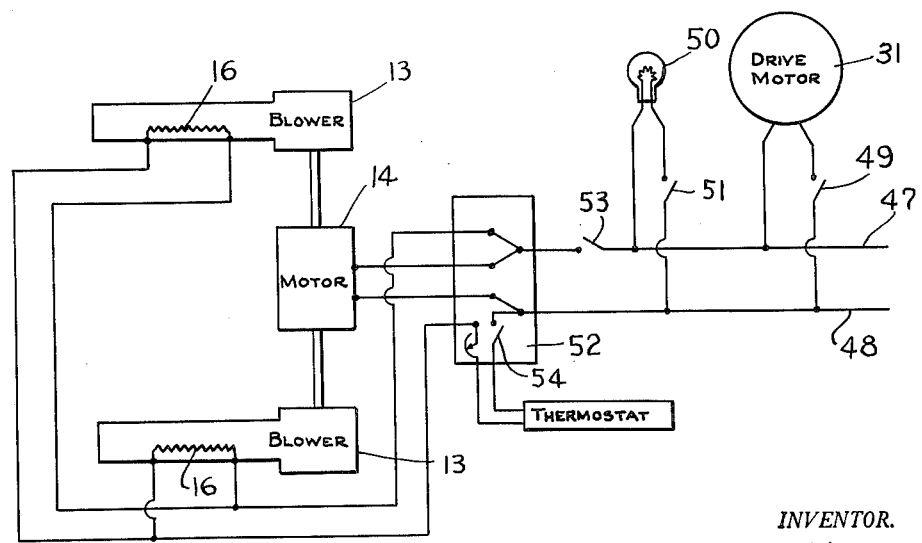

The invention will be more readily understood from a reading of the following specification and by reference to the accompanying drawings forming a part thereof, wherein an example of the invention is shown and wherein:

FIGURE 1 is a perspective view, with parts broken away, illustrating an improved reel and tray construction in an oven having improved external heating means constructed in accordance with the present invention, FIGURE 2 is enlarged transverse sectional view looking toward the right-hand side of FIGURE 1 showing a reel assembly constructed in accordance with the present invention, FIGURE 3 is an enlarged sectional view taken on the line 3—3 in FIGURE 2, FIGURE 4 is an enlarged perspective view of a tray structure constructed in accordance with the present invention, FIGURE 5 is a side elevation looking toward the right-hand side of FIGURE 1 showing external heating means constructed in accordance with the present invention, and FIGURE 6 is a circuit diagram showing the various electrical means for operating the illustrated invention.

Referring more particularly to the drawings, an insulated substantially airtight oven is illustrated at A. Air is received from the interior of the oven through the ducts B located externally of and communicating with the upper portion of the oven and is heated in the passageways C which contain suitable means for heating the air. Such air is then forced into diffusing means illustrated in the form of elongated chambers E in the lower portion of the oven. The chambers E distribute the air thus heated, under uniform static pressure into the interior of the oven. A reel assembly includes a plurality of radially spaced tray assemblies F which are removably positioned upon stub shafts G having flat sides which are maintained in the same position with respect to the vertical so as to positively position the trays by engaging complementary surfaces carried by the trays. The operating mechanism H includes an eccentrically mounted spider which operates through linkage means to positively position the trays F by maintaining the stub shafts G in substantially the same position with respect to the vertical. It will be noted that the upper tray of each assembly F is removable as is best seen in FIGURE 4. Thus an increased number of edibles may be more economically baked in an oven of given size while requiring less attention from operators.

The insulated substantially airtight oven A includes a pair of insulated side walls 10 and a pair of hinged doors 11 having relatively large glass areas 11a. These doors 11 provide access to the oven and make the cooking operation visible at all times from the exterior of the oven. The oven A is extended to form a housing 12 to accommodate the means for operating the reel assembly and the means for heating air externally of the oven.

Insulated ducts or conduits B extend into the oven at the upper portion thereof and receive air from the oven delivering same to the intake side of suitable blowers 13. The blowers 13 are driven by the single motor 14 through the shaft 15. Such air is discharged into the insulated passageways C which contain heating means in the form of exposed electrical resistors 16. Air is returned to the oven in the lower portion thereof through the passageways or conduits D into elongated flattened vertically disposed chambers E. The chambers E have a sliding fit with the conduits D as at 17. A plurality of apertures 18 provide for uniformly dispersing air into the oven A under static pressure built up in the chambers E by the blowers 13. Baffle means such as the baffle 19 are so positioned as to provide an increased effective cross sectional area toward the closed end within the chamber E thus tending to maintain a uniform static pressure through the length of each chamber E.

A plurality of tray assemblies F are removably positioned between the discs 20 and 21 included in the reel assembly. The discs 20 and 21 are fixed upon a centrally located driven shaft 22 which is journaled adjacent its ends within the oven walls 10. The disc 20 is provided with a plurality of circumferentially spaced stub shafts comprising pins 23 which are accommodated by bearing blocks 25 carried by the tray assemblies F. A second group of bearing blocks 25 carried adjacent the other ends of the tray assemblies F remote from the pins 23 have non-circular openings or apertures formed by the vertical walls 25a and 25b which are joined a by an arcuate upper portion 25c. Each stub shaft G has complementary sides 26a, 26b and an arcuate upper portion 26c. Thus the entire tray assembly F is removable from the pins 23 and the end of the stub shaft G by simply raising the entire tray assembly to disengage the bearing block 25 from the stub shaft G.

The individual tray assemblies F include a lower tray 27 which has a flat surface. The relatively heavy metal casting which forms the tray 27 includes downturned flanges 27a adjacent each end thereof. A standard 28 of like material is secured adjacent each end thereof and is suitably secured to the lower tray as by welding. An upper superposed tray 29 is also formed of relatively heavy metal and has downturned end portions as at 29a. The downturned portions 29a have an aperture 30 which has upwardly converging sides 30a for engaging complementary upwardly converging sides 28a of the standard 28. The upper superposed tray 29 is thus removable from the assembly without removing the assembly from the oven to facilitate removal of edibles from the oven and for ease in cleaning.

An electric motor 31 is positioned on a suitable support 32 within the oven housing 12 to operate the means for driving the shaft 22 through gear reducing mechanism 33. A power take-off shaft 34 from the gear reducing mechanism carries a pulley 35 fixed thereto for driving the belt 36. The belt 36 drives a pulley 37 which is fixedly connected adjacent the end of the shaft 22 within the housing 12.

The operating mechanism H includes a spider 38 positioned upon a bearing block 39 having an annular flange 39a which is suitably fastened to the oven wall 10 on the right-hand side of FIGURE 1 as by screws 39b. The bearing block 39 has a bearing surface 39c. A bore 39d is eccentrically positioned in the bearing block in a horizontal plane passing through the axis of the bearing block 39. The shaft 22 is journaled within the bore 39d. The spider 38 has an eccentric aperture 40 therein which carries a bushing 40a secured therein by suitable fastenings in the form of screws 40c thus providing antifriction means for rotatably mounting the spider 38 upon the bearing surface 39c. The spider 38 has a plurality of circumferentially spaced arms 38a which carry links 41 adjacent the ends thereof for rotation upon suitable antifriction means in the form of ball bearings 42. The link 41 has fixed connection to another link 43 at right angles thereto by suitable fastening means in the form of a bolt 44. The link 43 is suitably connected to the stub shaft 26 by fastening means in the form of the bolt 45. The inner portion 26 of stub shaft G is provided with a bushing 46 so that the disc 21 may rotate with respect thereto.

It will be noted especially by reference to FIGURE 2 that the links 43 are always maintained in horizontal position for any position of any of the tray assemblies F. This is brought about by the spider following the eccentric bearing surface 39c. Thus the flat sides 26a and 26b of the stub shaft G will always be disposed in the same vertical position so that all of the trays will be positively positioned in the same horizontal position for any of their positions about the central axis of the shaft 22.

A circuit diagram for the various electrical elements is illustrated in FIGURE 6 in which a suitable source of electrical energy (not shown) is connected across the lines 47 and 48. The electric motor 31 is connected across the line and is provided with a switch 49 for energizing and de-energizing the motor. An oven light 50 is also connected across the line and is also provided with an on-and-off switch 51. The blower motor 14 is connected across the lines 47 and 48 through a thermostat 52 so as to operate when the switch 53 is closed to complete the circuit. It will be noted that the blower motor 14 is so connected as to operate when the switch 53 is closed. The electrical heating elements, which are illustrated in the form of resistance coils 16, may be de-energized by virtue of the opening of the switch 54 which forms a part of the thermostat. Thus the blower constantly circulates air within the oven taking same from the top thereof and through the insulated tubes B to the passageways C and into the chambers E for distribution in the oven during the baking operation, while the heating elements 16 are energized responsive to the setting of the thermostat 52 when necessary in order to maintain the desired temperature.

While a preferred embodiment of the invention has been described using specific terms, such description is for illustrative purposes only, and it is to be understood that changes and variations may be made without departing from the spirit or scope of the following claims.

I claim:

1. An oven assembly having substantially airtight insulated oven walls including, a driven shaft centrally located within the oven journaled adjacent its ends within the walls, a hub fixed to one of said oven walls, an axial bore within said hub in which said shaft is eccentrically journaled, a spider having spaced fixed arms rotatably mounted upon said hub, a first stub shaft journaled adjacent the free end of each of the arms, a link fixed to each of said stub shafts, second stub shafts parallel to said first stub shafts to which said links are fixed adjacent their one of respective ends, a disc coaxial with and fixed upon said driven shaft, said disc having a plurality of circumferentially spaced apertures in which said second stub shafts are journaled, a plurality of tray assemblies, each of said tray assemblies having supporting members adjacent their ends and defining a non-circular opening at their bottom to provide bearing surfaces, the other ends of said second stub shafts having sides complementary to said bearing surfaces and positively engaging same to prevent relative rotation of said tray assemblies and second stub shafts for removably positioning the tray assemblies on the second stub shafts.

2. The structure set forth in claim 1, in which each tray assembly includes upper and lower superposed trays, a standard at each end of said lower trays supporting said upper trays, complementary upwardly converging sides being provided on each of said standards and each end of said upper trays.

3. In an oven assembly having a driven central shaft and a plurality of spaced supports carried thereby, the improvement including, a plurality of bottom trays, a standard positioned adjacent each end of the bottom trays and having fixed connections thereto, upwardly converging sides formed on each standard, abutments fixed adjacent the top of said standards, means carried by the supports engaging the abutments of said standards, and a plurality of top trays having complementary upwardly converging sides carried adjacent each end thereof engaging the converging sides of the standards of the bottom trays in superposed relation to said bottom trays.

References Cited by the Examiner
UNITED STATES PATENTS

| | | | |
|---|---|---|---|
| 2,002,655 | 5/1935 | Bolling | 107—59 |
| 2,927,545 | 3/1960 | Hieb | 107—59 |

WALTER A. SCHEEL, *Primary Examiner.*

CHARLES A. WILLMUTH, ROBERT E. PULFREY,
*Examiners.*